(12) United States Patent
Lal et al.

(10) Patent No.: US 9,705,892 B2
(45) Date of Patent: Jul. 11, 2017

(54) TRUSTED TIME SERVICE FOR OFFLINE MODE

(71) Applicant: Intel Corporation, Santa Clara, CA (US)

(72) Inventors: Reshma Lal, Hillsboro, OR (US); Jason Martin, Beaverton, OR (US); Daniel Nemiroff, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/317,579

(22) Filed: Jun. 27, 2014

(65) Prior Publication Data

US 2015/0381634 A1 Dec. 31, 2015

(51) Int. Cl.
*H04L 9/32* (2006.01)
*G06F 7/04* (2006.01)
*H04L 29/06* (2006.01)

(52) U.S. Cl.
CPC ........... *H04L 63/12* (2013.01); *H04L 9/3226* (2013.01); *H04L 9/3297* (2013.01); *H04L 63/0428* (2013.01); *H04L 2209/603* (2013.01)

(58) Field of Classification Search
CPC . H04L 63/12; H04L 63/0428; H04L 63/0876; H04L 9/3226
USPC ...................................................... 713/400
See application file for complete search history.

(56) References Cited

U.S. PATENT DOCUMENTS

| | | | | |
|---|---|---|---|---|
| 5,117,351 A | * | 5/1992 | Miller | |
| 5,636,373 A | * | 6/1997 | Glendening et al. ......... 713/400 |
| 6,606,707 B1 | * | 8/2003 | Hirota ..................... G06F 21/10 | 713/172 |
| 6,708,281 B1 | * | 3/2004 | Walsh ................... H04J 3/0641 | 713/400 |
| 7,185,219 B1 | * | 2/2007 | Bachmeier ............ H04L 7/0079 | 713/400 |
| 7,314,169 B1 | * | 1/2008 | Jasper ..................... G06F 21/31 | 235/382 |
| 7,444,516 B2 | * | 10/2008 | Buck ....................... H04L 9/321 | 713/178 |

(Continued)

FOREIGN PATENT DOCUMENTS

| | | |
|---|---|---|
| WO | 2010/057065 A3 | 5/2010 |
| WO | WO2010/057065 A2 | 5/2010 |
| WO | WO2011/078855 A9 | 6/2011 |

OTHER PUBLICATIONS

Anati, Ittai, et al., "Innovative Technology for CPU Based Attestation and Sealing", Intel Corporation, 2013, pp. 1-7.

(Continued)

*Primary Examiner* — Dede Zecher
*Assistant Examiner* — Abdullah Almamun
(74) *Attorney, Agent, or Firm* — Lowenstein Sandler LLP

(57) ABSTRACT

Systems and methods for providing trusted time service for the off-line mode of operation of a processing system. An example processing system comprises: a first processing device communicatively coupled to a real-time clock, the first processing device to modify an epoch value associated with the real-time clock responsive to detecting a reset of the real-time clock; and a second processing device to execute, in a first trusted execution environment, a first application to receive, from the first processing device, a first time value outputted by the real-time clock and a first epoch value associated with the real-time clock.

17 Claims, 13 Drawing Sheets

(56) References Cited

U.S. PATENT DOCUMENTS

| | | | | |
|---|---|---|---|---|
| 7,921,319 B2* | 4/2011 | Vertes | ............... | G06F 11/1683 |
| | | | | 713/400 |
| 8,176,546 B2* | 5/2012 | Waisbard et al. | ............... | 726/19 |
| 2005/0050325 A1* | 3/2005 | Ohkubo | ............... | G06F 21/31 |
| | | | | 713/168 |
| 2005/0066211 A1* | 3/2005 | Heinrich | ............... | H04J 3/0638 |
| | | | | 713/375 |
| 2005/0138455 A1* | 6/2005 | Loukianov | ......... | H04N 21/4302 |
| | | | | 713/400 |
| 2005/0264400 A1* | 12/2005 | Fisher | ............... | G07C 9/00103 |
| | | | | 340/5.73 |
| 2006/0242326 A1* | 10/2006 | Camiel | ............... | 709/246 |
| 2008/0209249 A1* | 8/2008 | Tso | ............... | 713/500 |
| 2009/0016537 A1* | 1/2009 | Ju | ............... | H04H 60/15 |
| | | | | 380/278 |
| 2009/0083372 A1* | 3/2009 | Teppler | ............... | 709/203 |
| 2009/0089842 A1* | 4/2009 | Perry | ............... | H04W 72/005 |
| | | | | 725/78 |
| 2011/0305333 A1* | 12/2011 | Jacobson et al. | ............... | 380/44 |
| 2012/0163589 A1* | 6/2012 | Johnson | ............... | G06F 21/10 |
| | | | | 380/30 |
| 2013/0019109 A1* | 1/2013 | Kang | ............... | G06F 21/10 |
| | | | | 713/193 |
| 2013/0159726 A1 | 6/2013 | McKeen et al. | | |
| 2014/0297962 A1* | 10/2014 | Rozas | ............... | G06F 12/1027 |
| | | | | 711/135 |
| 2015/0186659 A1* | 7/2015 | Leslie-Hurd | ............... | G06F 12/0875 |
| | | | | 726/1 |
| 2015/0372811 A1* | 12/2015 | Le Saint | ............... | H04L 9/0841 |
| | | | | 705/76 |

OTHER PUBLICATIONS

Greene, James, "Intel® Trusted Execution Technology—Hardware-based Technology for Enhancing Server Platform Security", Intel Corporation, Copyright 2010-2012, 8 pages.

Hoekstra, Matthew, et al., "Using Innovative Instructions to Create Trustworthy Software Solutions", Intel Corporation, Copyright 2013, pp. 1-8.

McKeen, Frank, et al., "Innovative Instructions and Software Model for Isolated Execution", Intel Corporation, Copyright 2013, pp. 1-8.

"Software Guard Extensions Programming Reference", Intel Corporation, Chapters 1-7, Reference No. 329298-001US, Sep. 2013, 156 Pages.

* cited by examiner

TRUSTED TIME SERVICE FOR OFFLINE MODE

TECHNICAL FIELD

The present disclosure is generally related to processing systems, and is specifically related to systems and method for providing trusted time service for the off-line mode of operation of a processing system.

BACKGROUND

Various digital rights management (DRM) policies may comprise time-based rules and thus may rely upon the time source of the computing device which enforces the policy. In various computing devices, the system time provided by the operating system may be modified and thus a time-based DRM policy may be circumvented when the computing device operates in the offline mode and thus does not have access to a trusted online time source.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
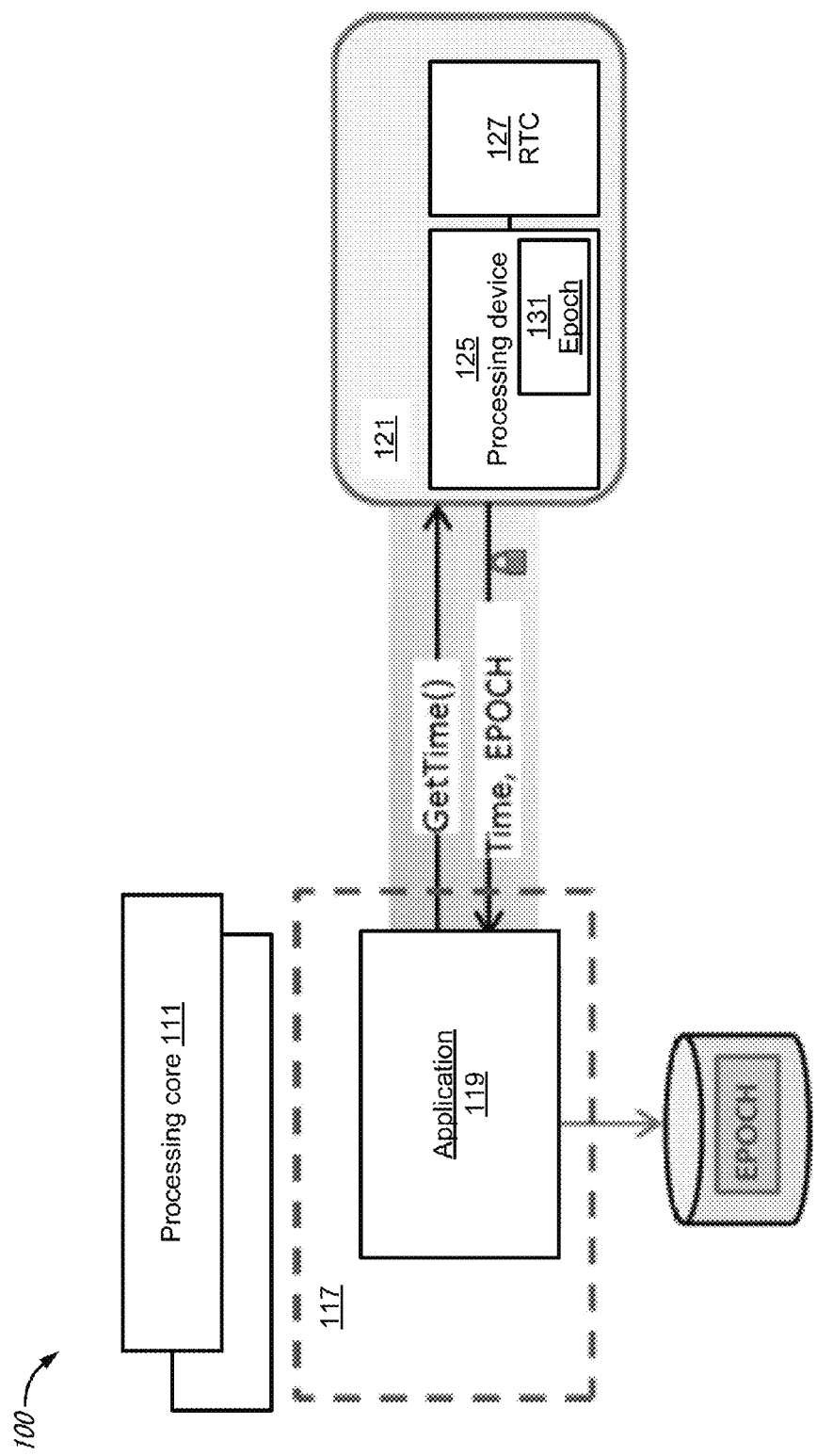
FIG. 1 illustrates a functional diagram of an example processing system comprising a trusted on-platform time source, in accordance with one or more aspects of the present disclosure.

Described herein are processing systems and related methods for providing trusted time service for the off-line mode of operation of a processing system. "Off-line mode" herein shall refer to a mode of operation in which a processing system is not connected over a network to a trusted time source.

In various computing devices, the system time provided by the operating system may be modified and thus a time-based Digital Rights Management (DRM) policy may be circumvented when the computing device operates in the offline mode and thus does not have access to a trusted online time source. The present disclosure addresses this and other deficiencies by disclosing a processing system and a method for providing a trusted time service for the off-line mode of operation of a processing system. The time value may be considered trusted if the application executing in a trusted execution environment (TEE) may authenticate the time source, verify that the time value has not been modified during transmission, verify that a message comprising the time value has not been replayed, and detect resetting of or tampering with the trusted time source.

In accordance with one or more aspects of the present disclosure, a processing system may comprise an on-platform time source provided by a specialized processing device communicatively coupled to a hardware-based real-time clock (RTC) and capable of detecting modifications or resetting of the RTC. The current time value produced by the on-platform time source may be securely delivered to an application executing in an architecturally-protected execution environment. The latter may be provided by a secure enclave implemented by a processing device executing instructions accessing the data residing in an architecturally protected memory.

In certain implementations, in order to reduce the load on the specialized processing device implementing the above internal time source, the processing system may further implement a specialized platform services enclave (PSE) for providing time services to a large number of applications using the internal time source.

In various illustrative examples, DRM application responsible for enforcing a lease policy on an electronic document may rely on the current time values obtained from the internal time source or the PSE, as described in more details herein below. Various aspects of the above referenced methods and systems are described in more details herein below by way of examples, rather than by way of limitation.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation in order to provide a thorough understanding of the present disclosure. It will be apparent, however, to one skilled in the art that these specific details need not be employed to practice the methods disclosed herein. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

Although the following examples are described with reference to a processor, other implementations are applicable to other types of integrated circuits and logic devices. Similar techniques and teachings of examples described herein can be applied to other types of circuits or semiconductor devices that can benefit from higher pipeline throughput and improved performance. The teachings of examples described herein are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed.

The examples illustrating the present disclosure and accompanied drawings should not be construed in a limiting sense as they are merely intended to provide examples of embodiments described herein rather than to provide an exhaustive list of all possible implementations of embodiments described herein. Although the below examples describe instruction handling and distribution in the context of execution units and logic circuits, other implementations of the systems and methods described herein can be accomplished by way of a data or instructions stored on a machine-readable, tangible medium, which when performed by a machine cause the machine to perform functions consistent with at least one embodiment described herein. In certain implementations, functions associated with embodiments described herein are embodied in machine-executable instructions. The instructions can be used to cause a general-purpose or special-purpose processor that is programmed with the instructions to perform the methods described herein. Implementations described herein may be provided as a computer program product or software which may include a machine or computer-readable medium having stored thereon instructions which may be used to program a computer (or other electronic devices) to perform one or more operations according to embodiments described herein. Alternatively, operations of systems and methods described herein may be performed by specific hardware components that contain fixed-function logic for performing the operations, or by any combination of programmed computer components and fixed-function hardware components.

Instructions used to program logic to perform the methods described herein can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

"Processor" herein shall refer to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may include one or more processing cores, and hence may be a single core processor which is typically capable of processing a single instruction pipeline, or a multi-core processor which may simultaneously process multiple instruction pipelines. In another aspect, a processor may be implemented as a single integrated circuit, two or more integrated circuits, or may be a component of a multi-chip module (e.g., in which individual microprocessor dies are included in a single integrated circuit package and hence share a single socket).

FIG. 1 illustrates a simplified functional diagram of an example processing system 100 operating in accordance with one or more aspects of the present disclosure. A more detailed description of various components of processing system 100 is presented herein below with references to FIG. 6.

Referring now to FIG. 1, example processing system 100 may comprise one or more processing cores 111 configured execute an application 119 within a trusted execution environment (TEE) 117. The latter may be provided by a secure enclave, as described in more details herein below. Example processing system 100 may further comprise an on-platform time source application 121 running on a specialized processing device 125 communicatively coupled to a hardware-based real-time clock (RTC) 127 and capable of detecting modifications or resetting of the RTC. Processing device 125 may store, in a register 131, an epoch value associated with RTC 127. In certain implementations, the epoch value may be encrypted before storing. The epoch value may be utilized by application 119 for detecting a reset of or tampering with RTC 127. Processing device 125 may be configured to modify the epoch value responsive to detecting a certain event (such as reset or a power up event) with respect to RTC 127. In an illustrative example, the epoch value may be initialized by a random value every time when RTC 127 is reset or powered up.

In certain implementations, application 119 executing within TEE 117 may utilize a platform-specific mechanism to authenticate on-platform time service application 121 executing on processing device 125. In an illustrative example the authentication mechanism may comprise receiving, by application 119, a cryptographically protected (e.g., by a group cryptographic protocol) identifier of on-platform time service application 121.

Responsive to successfully authenticating on-platform time service application 121 executing on processing device 125, application 119 may establish, using a shared key, a secure communication channel to processing device 125. The secure communication channel provides message authentication, protects the message integrity, and prevents replay of the messages flowing between application 119 and processing device 125.

Responsive to establishing a secure communication channel with processing device 125, application 119 may transmit, to processing device 125, a message requesting creation of a virtual clock. In an illustrative example, the message may comprise a base time value for initializing the virtual clock. Responsive to initializing the virtual clock, processing device 125 may transmit, to application 119, a message comprising the current time value of the virtual clock and an epoch value associated with RTC 127. Responsive to receiving the message confirming the successful virtual clock initialization, application 119 may securely store the received epoch value for authenticating the subsequently received time messages.

At any time after successfully completing the above described virtual clock initialization sequence, application 119 may transmit, to processing device 125, a message requesting the current time value. Processing device 125 may respond by a message comprising the current time value of the virtual clock associated with application 119 and an epoch value associated with RTC 127. Responsive to receiving the current time message, application 119 may compare the received epoch value with the stored epoch value. Should the two values match, the current time value may be declared valid and utilized for the subsequent application-specific processing. Mismatching received and stored epoch values may indicate that the RTC has been reset after the initialization of the virtual clock associated with application 119, and hence application 119 may discard the received current time value and perform an application-specific or platform-specific recovery action.

On-platform time source application 121 may have limited resource and thus may be capable of providing the time service to a limited number of applications. In certain implementations, processing system 100 may be configured to execute, in a trusted execution environment (TEE), a time service application configured to provide the secure time service to an arbitrary large number of applications being executed by processing system 100.

Figure 2:
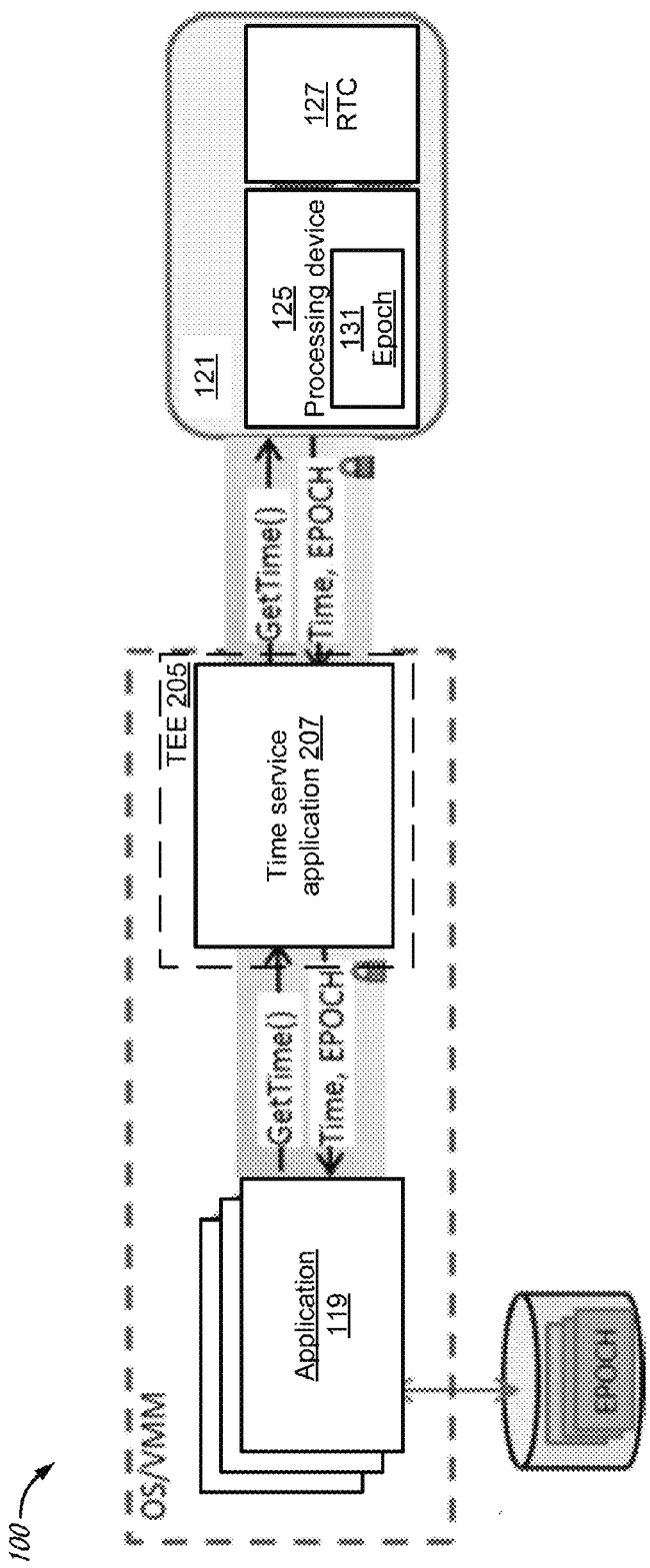
FIG. 2 illustrates a functional diagram of an example processing system comprising a time service application being executed in a trusted execution environment, in accordance with one or more aspects of the present disclosure.

FIG. 2 illustrates a functional diagram of an example processing system comprising a time service application being executed in a trusted execution environment, in accordance with one or more aspects of the present disclosure. Referring now to FIG. 2, processing system 100 may be configured to execute, in a trusted execution environment (TEE) 205, a time service application 207. In an illustrative example, TEE 205 may be provided by a secure enclave. Application 119 executing within TEE 117 may utilize a platform-specific mechanism to authenticate time service application 207 executing within TEE 205. In an illustrative example, the authentication mechanism may comprise receiving, by application 119, a cryptographically protected (e.g., by a local enclave attestation protocol) identifier of TEE 205.

Responsive to successfully authenticating time service application 207, application 119 may establish, using a shared key, a secure communication channel to TEE 205 within which time service application 207 is executing. The secure communication channel provides message authentication, protects the message integrity, and prevents replay of the messages flowing between application 119 and time service application 207.

Responsive to establishing a secure communication channel with time service application 207, application 119 may transmit, to time service application 207, a message requesting the current time value. Responsive to receiving the current time request, time service application 207 may in turn request the current time value from on-platform time source application 121 executing on processing device 125.

On-platform time source application 121 may respond by a message comprising the current time value and an epoch value associated with RTC 127. Time service application 207 may forward the response to application 119.

Responsive to receiving the current time message, application 119 may compare the received epoch value with the stored epoch value. Should the two values match, the current time value may be declared valid and utilized for the subsequent application-specific processing. Mismatching received and stored epoch values may indicate that the RTC has been reset after the initialization of the virtual clock associated with application 119, and hence application 119 may discard the received current time value and perform an application-specific or platform-specific recovery action.

The above described systems and methods provide the relative time that elapsed between two current time requests. In certain implementations, application 119 may need to utilize the real world time in a specified time zone. In an illustrative example, application 119 may request the current time from both on-platform trusted time source and an on-line time source providing the real world time in a specified time zone, and securely store the time zone offset (i.e., the difference between local time source time and the real world time in the specified time zone) locally, for later determining the current time based on the trusted time source.

Figure 3:
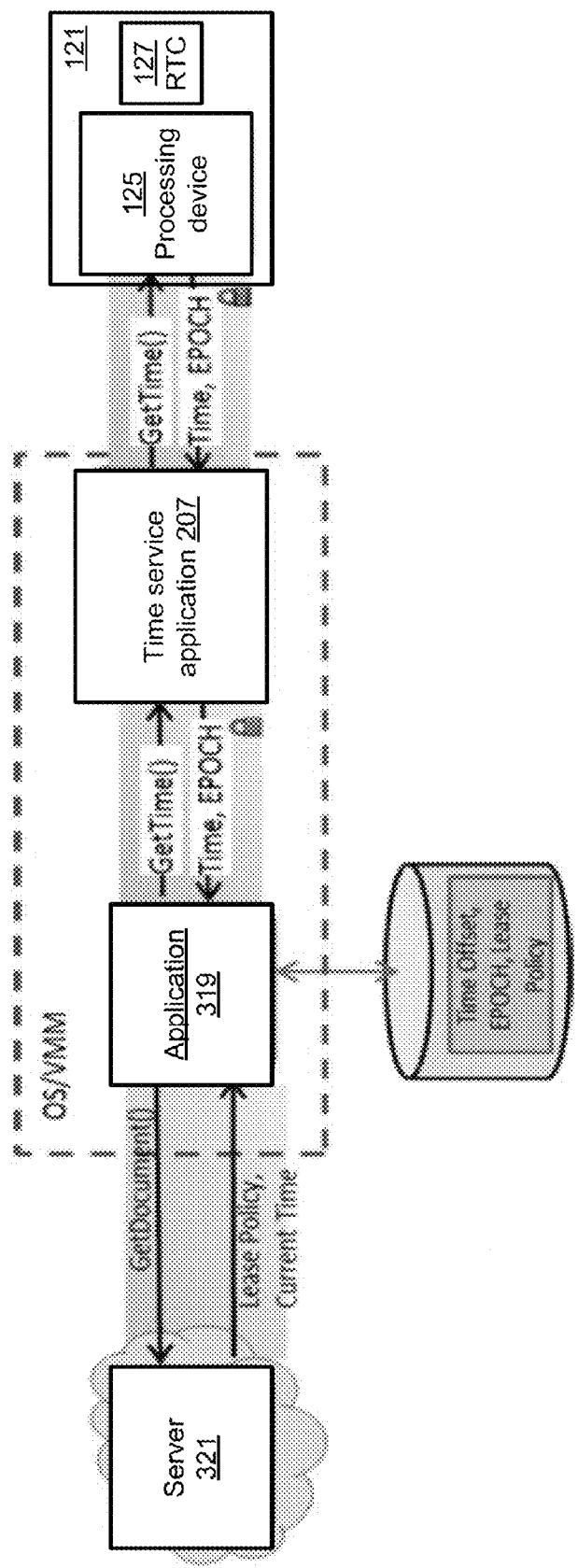
FIG. 3 illustrates a functional diagram of an example processing system comprising a digital content consumption application configured to enforce time-based lease policies, in accordance with one or more aspects of the present disclosure.

In certain implementations, the above described systems and methods may be utilized by a digital content consumption application (e.g., video or audio stream playback application). FIG. 3 illustrates a functional diagram of an example processing system comprising a digital content consumption application configured to enforce time-based lease policies, in accordance with one or more aspects of the present disclosure. As schematically illustrated by FIG. 3, application 319 may utilize the on-platform trusted time source 121 to enforce time-based lease policies with respect to digital content items received from digital content server 321.

In an illustrative example, application 319 executing on processing system 100 may receive a digital content item from digital content server 121. In certain implementations, the lease policy associated with the digital content item may specify the amount of time during which the digital content item may be consumed by application 319 (e.g., a video content item may be available for playback during 24 hours after the download). Alternatively, the lease policy associated with the digital content item may specify the lease expiration time represented by a real-world time value in a certain time zone.

Responsive to receiving the digital content item, application 319 may request, via time service application 207, the current time from on-platform trusted time source 121, as described in more details herein above. Application 319 may further request the current time from an online time source in a specified time zone, and securely store the time zone offset (i.e., the difference between local time source time and the real world time in the specified time zone) locally, for later determining the current time based on the trusted time source.

At any time during the lease lifetime, responsive to receiving the digital content item access request, application 319 may, in the offline mode of operation, use the local trusted time to determine whether the lease still valid before satisfying the access request. In an illustrative example, application 319 may request the current time value and calculate the difference between the lease start time and the current time to determine whether the time period-based lease has expired. In an illustrative example, application 319 may request the current time value and calculate the real world time in the specified time zone based on the previously stored time zone offset value, to determine whether the time-based lease has expired.

Figure 4:
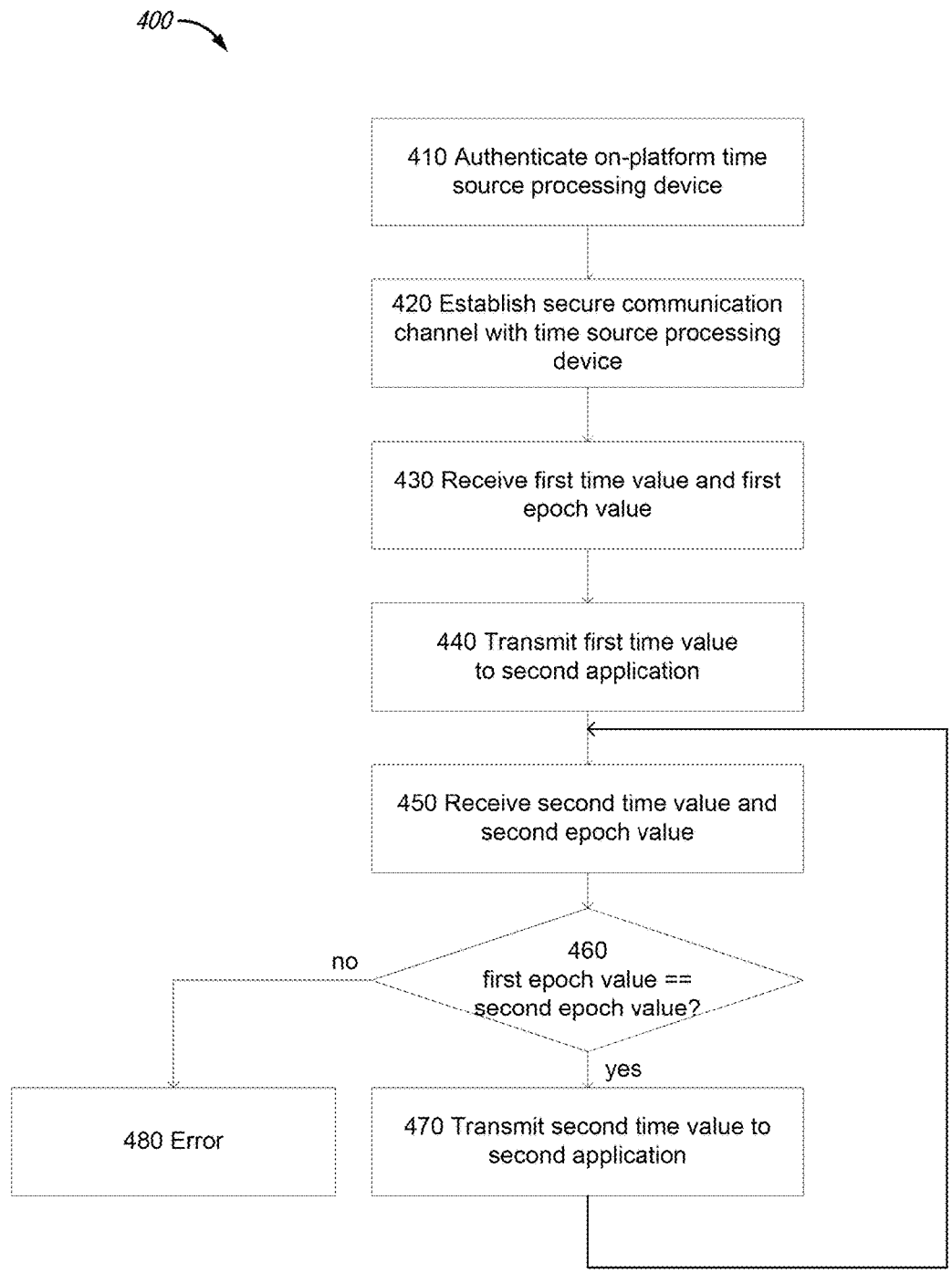
FIG. 4 depicts a flow diagram of an example method for providing trusted time service for the off-line mode of operation of a processing system, in accordance with one or more aspects of the present disclosure.

FIG. 4 depicts a flow diagram of an example method 400 for providing trusted time service for the off-line mode of operation of a processing system, in accordance with one or more aspects of the present disclosure. In an illustrative example, example method 400 may be executed by the time service application configured to provide the secure time service to an arbitrary large number of applications being executed by an example processing system, as described in more details herein above with references to FIG. 2.

Method 400 may be performed by a computer system that may comprise hardware (e.g., circuitry, dedicated logic, and/or programmable logic), software (e.g., instructions executable on a computer system to perform hardware simulation), or a combination thereof. Method 400 and/or each of its functions, routines, subroutines, or operations may be performed by one or more physical processors of the computer system executing the method. Two or more functions, routines, subroutines, or operations of method 400 may be performed in parallel or in an order which may differ from the order described above. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other. In one example, as illustrated by FIG. 4, method 400 may be performed by the computer systems described herein below and illustrated by FIGS. 7-14.

Referring to FIG. 4, at block 410, a first application being executed, in a trusted execution environment (TEE), by a first processing device of a processing system may utilize a platform-specific mechanism to authenticate a second processing device implementing a trusted time service. In an illustrative example the authentication mechanism may comprise receiving, by the first application, a cryptographically protected (e.g., by a group cryptographic protocol) identifier of the second processing device.

At block 420, the first application may establish a secure communication channel with a second processing device of the processing system. In an illustrative example, the first application may represent the time service application configured to provide the secure time service to an arbitrary large number of applications being executed by an example processing system, as described in more details herein above with references to FIG. 2.

In certain implementations, the second processing device may be communicatively coupled to a hardware-based real-time clock (RTC) and capable of detecting modifications or resetting of the RTC. The second processing device may be configured to modify the epoch value responsive to detecting a certain event (such as reset or a power up event) with respect to the RTC, as described in more details herein above. In an illustrative example, the epoch value may be initialized by a random value every time when the RTC has been reset or powered up.

At block 430, the first application may receive, over the cryptographically protected communication channel, a first time value outputted by the RTC and a first epoch value associated with the RTC. The epoch value may be utilized by the first application for detecting a reset of or tampering with the RTC, as described in more details herein above.

At block 440, the first application may transmit the first time value to a second application being executed in a second TEE. In an illustrative example, the second application may represent a digital content consuming application configured to enforce time-based lease policies, as described in more details herein above with references to FIG. 3.

At block 450, the first application may receive, over the cryptographically protected communication channel, a second time value outputted by the RTC and a second epoch value associated with the RTC.

Responsive to ascertaining, at block 460, that the first epoch value matches the second epoch value, the first application may, at block 470, transmit the second time value to the second application. Otherwise, at block 480, the first application may detect an error state and perform an application-specific or platform-specific recovery action.

Figure 5:
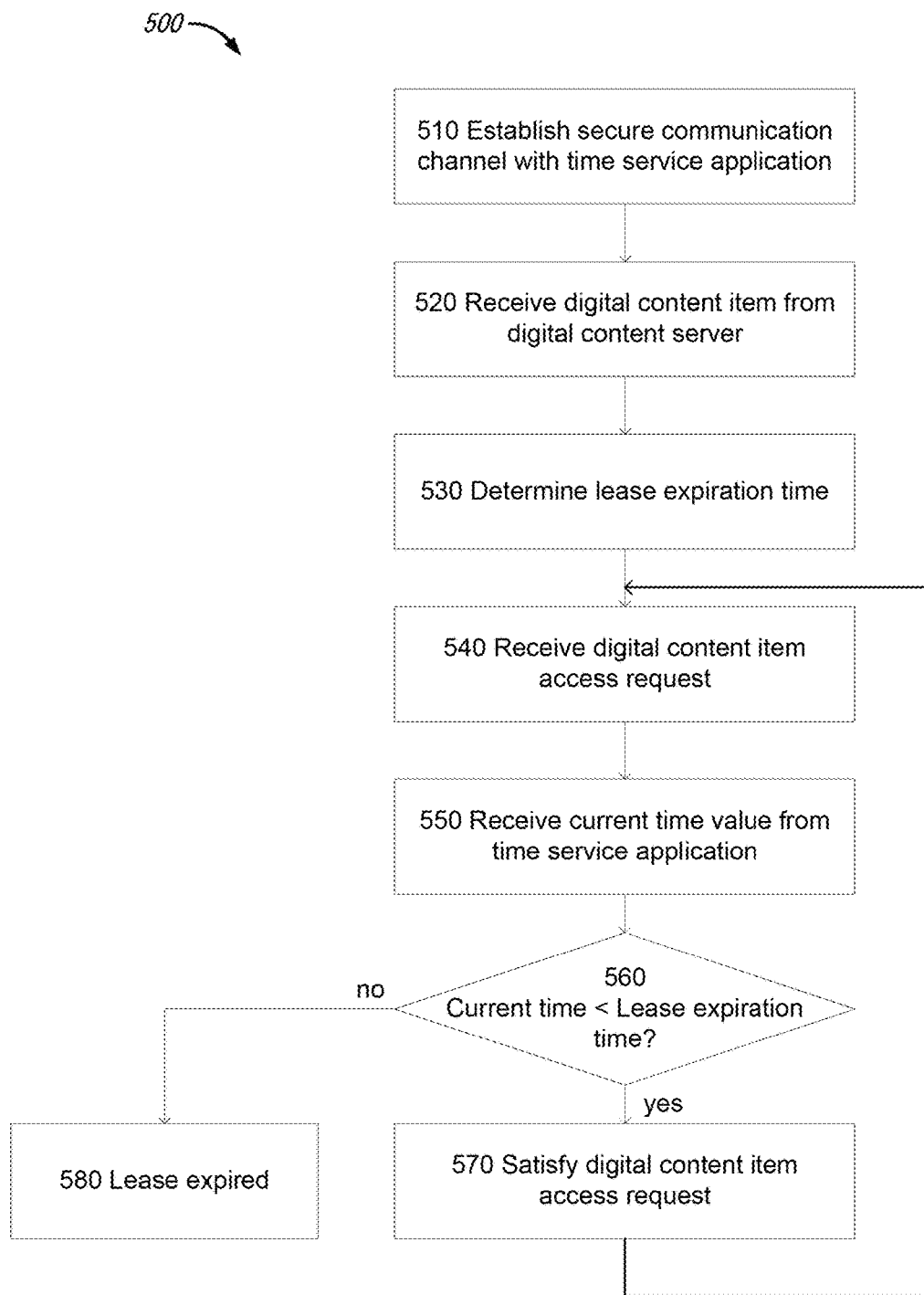
FIG. 5 depicts a flow diagram of an example method for enforcing time-based lease policies with respect to digital content items in the offline mode of operation, in accordance with one or more aspects of the present disclosure.

FIG. 5 depicts a flow diagram of an example method 500 for enforcing time-based lease policies with respect to digital content items in the offline mode of operation, in accordance with one or more aspects of the present disclosure. In an illustrative example, example method 500 may be executed by a digital content consumption application configured to enforce time-based lease policies with respect to digital content items received from a digital content server, based on a trusted local time source, as described in more details herein above with references to FIG. 3.

Method 500 may be performed by a computer system that may comprise hardware (e.g., circuitry, dedicated logic, and/or programmable logic), software (e.g., instructions executable on a computer system to perform hardware simulation), or a combination thereof. Method 500 and/or each of its functions, routines, subroutines, or operations may be performed by one or more physical processors of the computer system executing the method. Two or more functions, routines, subroutines, or operations of method 500 may be performed in parallel or in an order which may differ from the order described above. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processing threads implementing method 500 may be executed asynchronously with respect to each other. In one example, as illustrated by FIG. 5, method 500 may be performed by the computer systems described herein below and illustrated by FIGS. 7-15.

Referring to FIG. 5, at block 510, a first application being executed in a first trusted execution environment (TEE) by a processing system implementing the method may establish a secure communication channel with a second application being executed by the processing system in a second trusted execution environment (TEE). In an illustrative example, the first application may represent a digital content consuming application configured to enforce time-based lease policies, as described in more details herein above with references to FIG. 3. The second application may represent the time service application configured to provide the secure time service to an arbitrary large number of applications being executed by an example processing system, as described in more details herein above with references to FIG. 2.

At block 520, the processing system may receive, from a digital content server, a digital content item (e.g., a video stream file) and a lease policy associated with the digital content item.

At block 530, the processing system may determine, in view of the lease policy, the lease expiration time, as described in more details herein above.

Responsive to receiving, at block 540, a request to access the digital content item, the processing system may, at block 550, receive the current time value from the time service application.

Responsive to determining, at block 560, that the current time does not exceed the lease expiration time, the processing system may, at block 570, satisfy the digital content item access request; otherwise, at block 580, the processing system may disallow the digital content item access request.

Figure 6:
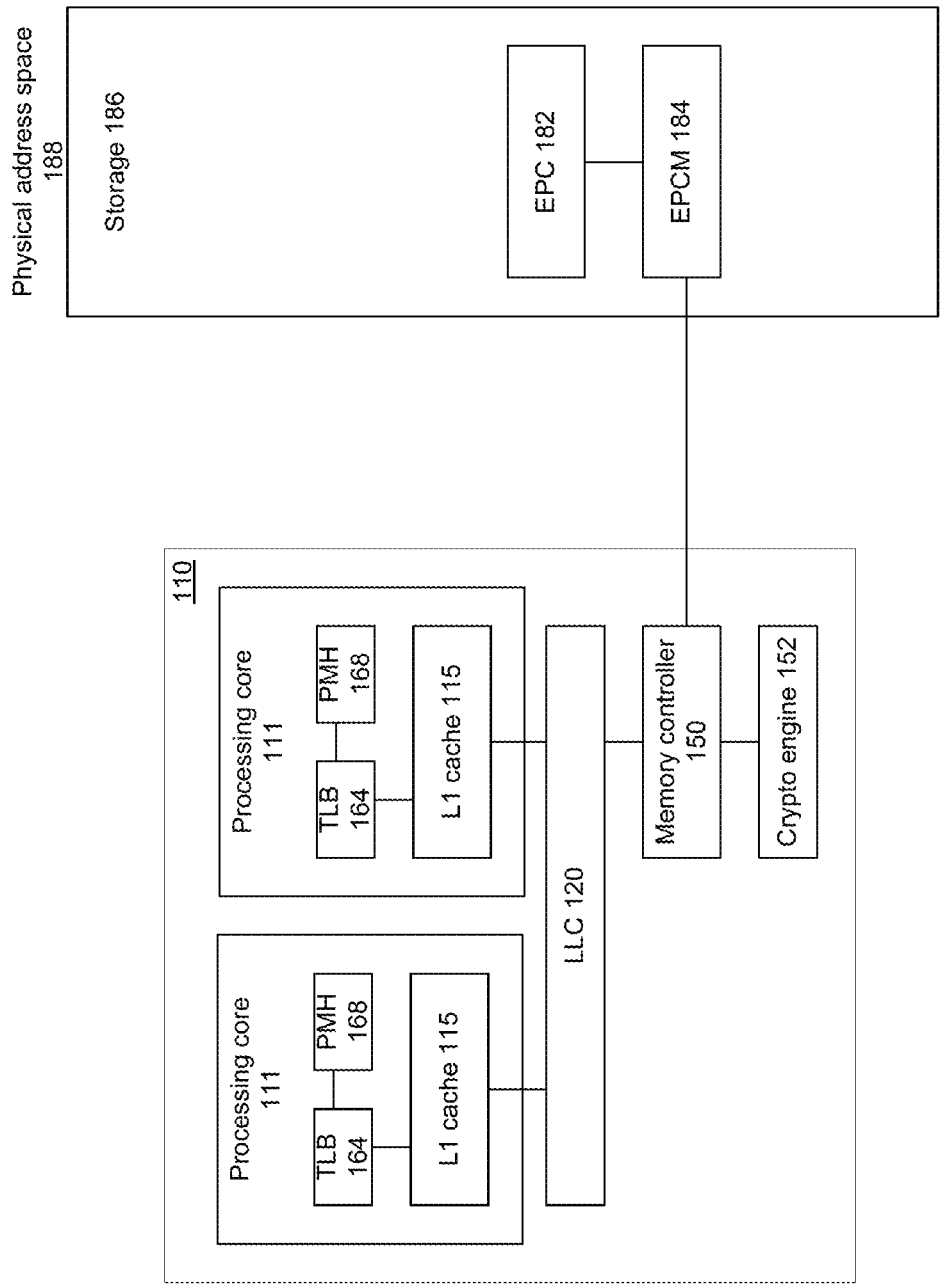
FIG. 6 illustrates a high-level component diagram of an example processing system operating in accordance with one or more aspects of the present disclosure.
Figure 7:
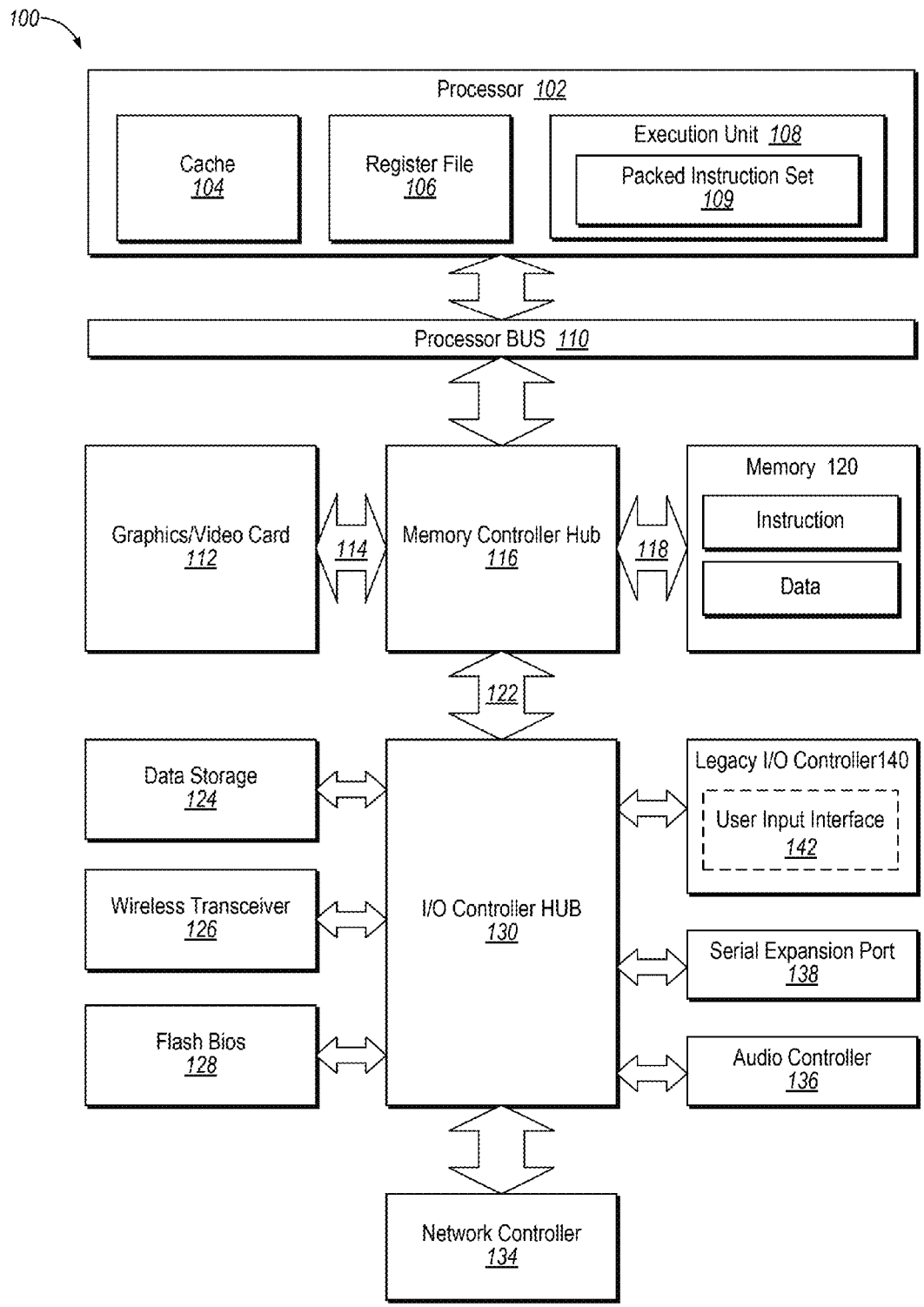
FIG. 7 depicts a high-level component diagram of an example computer system, in accordance with one or more aspects of the present disclosure.

FIG. 6 represents a more detailed component diagram of example processing system 100 in accordance with one or more aspects of the present disclosure. As shown in FIG. 4, processing system 100 may include a processing device 110 comprising one or more processing cores 111. Processing cores 111 in various implementations may be provided by in-order cores or out-or-order cores. In an illustrative example, processing core 111 may have a micro-architecture including processor logic and circuits used to implement an instruction set architecture (ISA). Processors with different micro-architectures can share at least a portion of a common instruction set. For example, the same register architecture of the ISA may be implemented in different ways in different micro-architectures using various techniques, including dedicated physical registers, one or more dynamically allocated physical registers using a register renaming mechanism (e.g., the use of a register alias table (RAT), a reorder buffer (ROB) and a retirement register file), as illustrated by FIGS. 6-7. Processing cores 111 may be associated with the respective local first level (L1) caches 115. Each L1 cache 115 may be communicatively coupled to a shared last level cache (LLC) 120. In an illustrative example, the cache hierarchy comprising L1 cache 115 and LLC 120 may be configured as an inclusive cache hierarchy, such that at least part of the information stored in L1 cache 115 may also be stored in LLC 120. In certain implementations, processing system 100 may also include various other components not shown in FIG. 1.

In accordance with one or more aspects of the present disclosure, processing system 100 may implement an architecturally protected memory. Processing core 111 may comprise processing logic configured to implement a trusted execution environment represented by a secure enclave, by executing instructions residing in the protected memory and accessing data residing in the protected memory, while preventing unauthorized access to the protected memory even by privileged applications, as described in more details herein below.

"Secure enclave" herein shall refer to a protected area within the application's address space. Access to the enclave memory from applications not resident in the enclave is prevented even if such access is attempted by a privileged application such as BIOS, operating systems or virtual machine monitors.

An active secure enclave may be divided into an encrypted portion and a decrypted portion. The encrypted portion may reside in an unprotected memory (such as main memory or disk). The decrypted portion resides in the enclave page cache (EPC) 182. The EPC is a protected memory used by the processing system to temporarily store enclave pages when they are not cryptographically protected. The EPC may be divided into pages of a pre-defined size, which may be referred to as EPC pages. The EPC is protected from any accesses by software residing outside the enclave. Furthermore, unauthorized parties will not be able to read or modify plain-text data belonging to enclaves that is loaded into the EPC via straight-forward hardware attacks. The EPC is located within the physical address space of the processing system, but can only be accessed using privileged or non-privileged enclave instructions used to build and enable an enclave, enter/exit the enclave, manage EPC, and perform various other operations.

There are several mechanisms of implementing the EPC. The EPC may be implemented as on on-die static random access memory (SRAM) or dynamic random access memory (DRAM). Alternatively, the EPC may be constructed by sequestering ways of the CPU's last-level cache. Another mechanism of implementing EPC is the Memory Encryption Engine (MEE). MEE herein shall refer to a hardware-implemented processing logic that encrypts the traffic between the processor package and the platform DRAM, thus providing a mechanism of creating a cryptographically protected volatile storage using the platform DRAM. MEE may intercept attempted memory accesses and route those accesses to a cryptographic controller, which may generate one or more memory accesses to the platform DRAM to fetch the cipher-text, processes the cipher-text to generate the plain-text, and satisfy the original memory access request.

Referring again to FIG. 1, L1 cache 115 can transfer data to and from the LLC 120. Memory controller 150 can be connected to the last level cache 120 and to MEE 180. Memory controller 150 can assess EPC 182 residing on backing storage device 186 within physical address space 188.

The Enclave Page Cache Map (EPCM) is a protected structure employed by the processing system to track the contents of the EPC. The EPCM may comprise a plurality of entries with each entry corresponding to a page in the EPC. Each EPCM entry may hold, in an implementation-dependent format, the following information: whether the EPC page is valid or invalid; an identifier of the enclave instance that owns the page; the type of the page (REG, TCS, VA, SECS); the virtual address through which the enclave is allowed to access the page; read/write/execute permissions for the page; whether the page is accessible or not (BLOCKED or UNBLOCKED).

The EPCM may be used by the processing system in the address translation flow to enforce access-control on the enclave pages loaded into the EPC. Logically it provides an additional secure layer of access control in addition to "legacy" segmentation, paging tables and extended paging tables mechanisms.

The EPC, EPCM, and various other implementation-specific data structures may be mapped to locations inside the architecturally protected memory. When a request to access the EPC is generated, processing system 100 may remap the request to the backing storage location containing encrypted EPC data, and retrieve the data.

Various enclave-related functions may be implemented in the microcode, supported by the hardware implementations of MEE and the processing logic implementing the enclave functionality. In certain implementations, the processing logic may control access to EPC 182 via a translation lookaside buffer (TLB) 164 and a page miss handler (PMH) 168.

In an illustrative example, a TLB may be implemented as a table mapping virtual addresses to physical addresses.

"TLB hit" refers to a situation when a requested virtual address is present in the TLB. "TLB miss" refers to the opposite situation: when the requested virtual address is not present in the TLB, the address translation may proceed by looking up the page table. After the physical address is determined, the virtual address to physical address mapping may be entered entered into the TLB.

Each TLB entry may include one or more bits indicating identifying the enclave owning the memory location referenced by the TLB entry. Alternatively, if these bits are not provided, a TLB flush will be needed when exiting the secure enclave to prevent unauthorized access to the EPC. In an illustrative example, if a TLB miss occurs, an extra lookup may fetch data from the EPC map on multiple memory references. The PMH may perform the look up of the EPC map.

Although various systems and methods are described herein with reference to specific integrated circuits, such as processors, other implementations may be applicable to other types of integrated circuits and logic devices. Techniques and teachings of systems and methods described herein may be applied to other types of circuits or semiconductor devices that may also benefit from better energy efficiency and energy conservation. For example, the disclosed implementations are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications may include a microcontroller, a digital signal processor (DSP), network computers (NetPC), set-top boxes, network hubs, wide area network (WAN) switches, or any other system that can perform the functions and operations taught below. Moreover, the systems and methods described herein are not limited to physical computing devices, but may also relate to software-implemented methods. Power savings realized by systems and methods described herein may be independent of and complementary to an operating system (OS)-based mechanism, such as the Advanced Configuration and Platform Interface (ACPI) standard.

The methods and systems described herein above may be implemented by computer system of various architectures, designs and configurations for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable to implement the methods described herein. In general, a large variety of systems or electronic devices capable of incorporating a processor and/or other execution logic as disclosed herein are generally suitable for implementing the systems and methods described herein.

FIG. 7 depicts a high-level component diagram of one example of a computer system in accordance with one or more aspects of the present disclosure. A processing system 100 may include a processor 110 to employ execution units including logic to perform algorithms for process data, in accordance with the present invention, such as in the embodiment described herein. System 100 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

In an illustrative example, processor 102 includes one or more execution units 108 to implement an algorithm that is to perform at least one instruction. One embodiment may be described in the context of a single processor desktop or server system, but alternative embodiments may be included in a multiprocessor system. The processor 102 is coupled to a processor bus 110 that transmits data signals between the processor 102 and other components in the system 100. The elements of system 100 (e.g. graphics accelerator 112, memory controller hub 116, memory 120, I/O controller hub 124, wireless transceiver 126, Flash BIOS 128, Network controller 134, Audio controller 136, Serial expansion port 138, I/O controller 140, etc.) perform their conventional functions that are well known to those familiar with the art.

In certain implementations, the processor 102 includes a Level 1 (L1) internal cache memory 104. Depending on the architecture, the processor 102 may have a single internal cache or multiple levels of internal caches. Other embodiments include a combination of both internal and external caches depending on the particular implementation and needs. Register file 106 is to store different types of data in various registers including integer registers, floating point registers, vector registers, banked registers, shadow registers, checkpoint registers, status registers, and instruction pointer register.

Execution unit 108, including logic to perform integer and floating point operations, also resides in the processor 102. The processor 102, in certain implementations, includes a microcode ROM to store microcode, which when executed, is to perform algorithms for certain macroinstructions or handle complex scenarios. Here, microcode is potentially updateable to handle logic bugs/fixes for processor 102. For one embodiment, execution unit 108 includes logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate implementations of an execution unit 108 may also be used in micro controllers, embedded processors, graphics devices, DSPs, and other types of logic circuits. System 100 includes a memory 120. Memory 120 includes a dynamic random access memory (DRAM) device, a static random access memory (SRAM) device, flash memory device, or other memory device. Memory 120 stores instructions and/or data represented by data signals that are to be executed by the processor 102.

A system logic chip 116 is coupled to the processor bus 110 and memory 120. The system logic chip 116 in the illustrated embodiment is a memory controller hub (MCH).

The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

Figure 8:
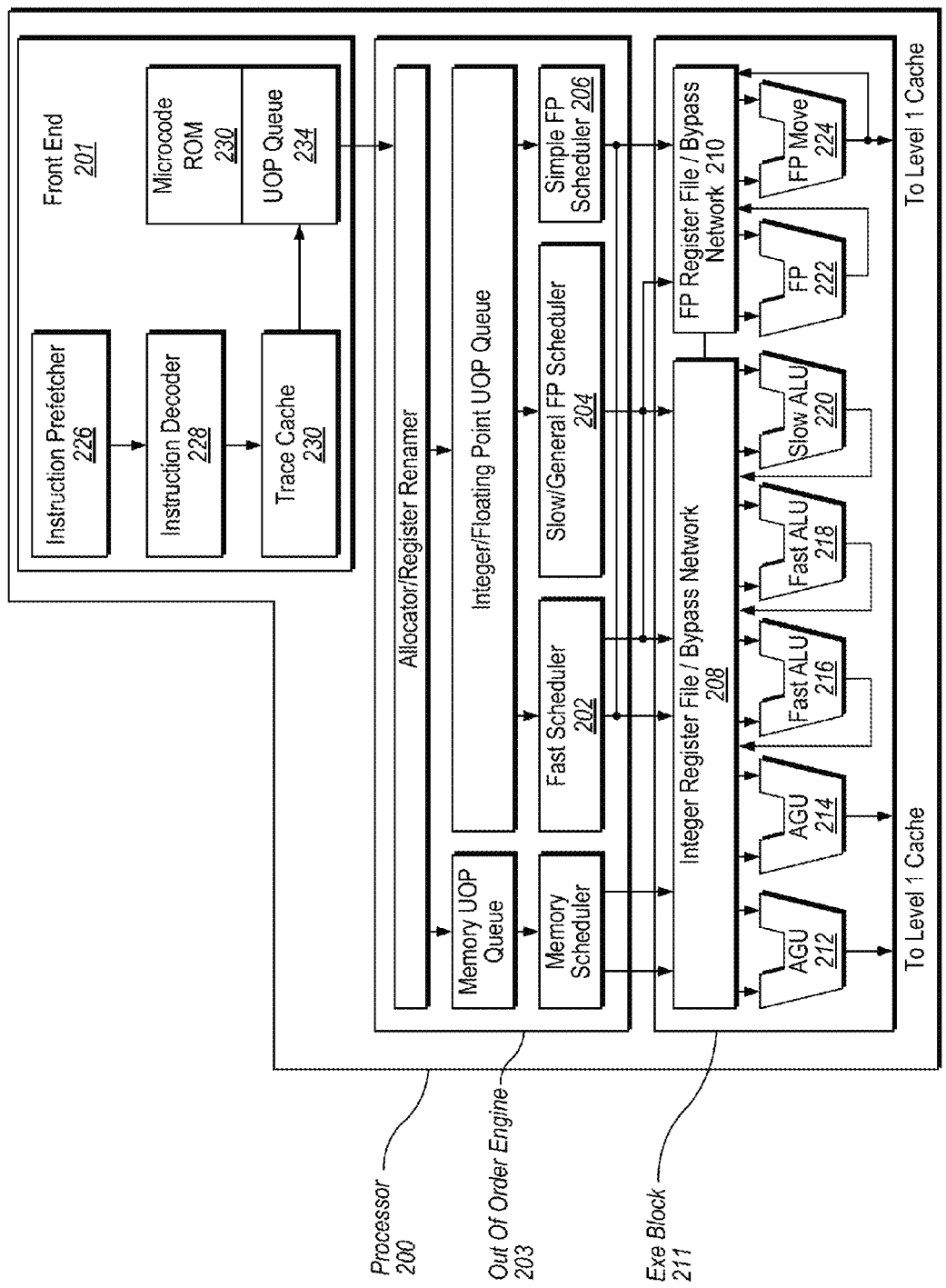
FIG. 8 depicts a block diagram of a processor, in accordance with one or more aspects of the present disclosure.
Figure 9:
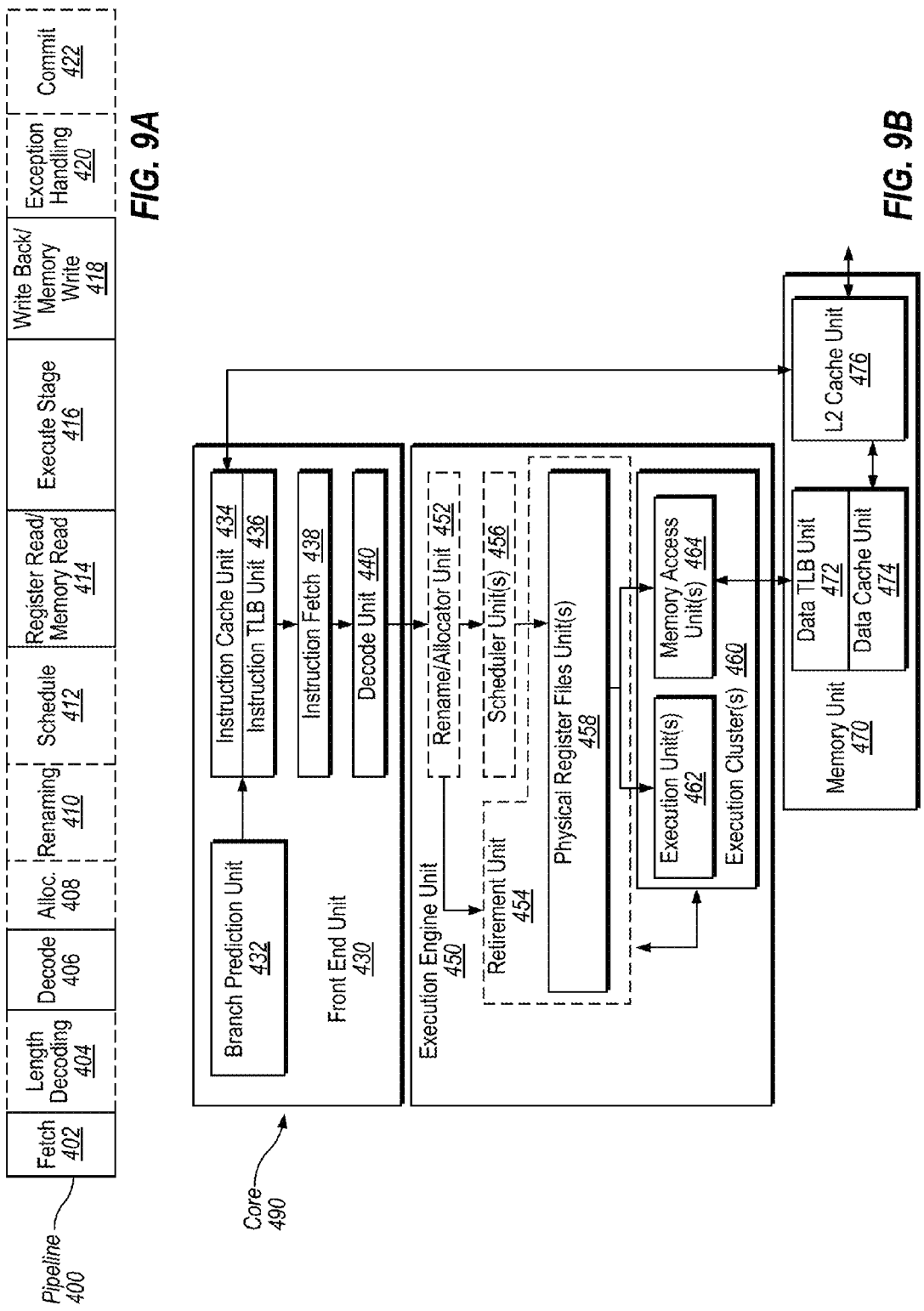
FIGS. 9a-9b schematically illustrates elements of a processor micro-architecture, in accordance with one or more aspects of the present disclosure.

FIG. 8 is a block diagram of the micro-architecture for a processor 200 that includes logic circuits to perform instructions in accordance with one or more aspects of the present disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 201 is the part of the processor 200 that fetches instructions to be executed and prepares them to be used later in the processor pipeline. The front end 201 may include several units. In one embodiment, the instruction prefetcher 226 fetches instructions from memory and feeds them to an instruction decoder 228 which in turn decodes or interprets them. For example, in certain implementations, the decoder decodes a received instruction into one or more operations called "micro-instructions" or "micro-operations" (also referred to as uops) that the machine can execute. In other embodiments, the decoder parses the instruction into an opcode and corresponding data and control fields that are used by the micro-architecture to perform operations in accordance with one embodiment. In one embodiment, the trace cache 230 takes decoded uops and assembles them into program ordered sequences or traces in the uop queue 234 for execution. When the trace cache 230 encounters a complex instruction, the microcode ROM 232 provides the uops needed to complete the operation.

Some instructions are converted into a single micro-op, whereas others need several micro-ops to complete the full operation. In one embodiment, if more than four micro-ops are needed to complete an instruction, the decoder 228 accesses the microcode ROM 232 to do the instruction. For one embodiment, an instruction can be decoded into a small number of micro ops for processing at the instruction decoder 228. In another embodiment, an instruction can be stored within the microcode ROM 232 should a number of micro-ops be needed to accomplish the operation. The trace cache 230 refers to an entry point programmable logic array (PLA) to determine a correct micro-instruction pointer for reading the micro-code sequences to complete one or more instructions in accordance with one embodiment from the micro-code ROM 232. After the microcode ROM 232 finishes sequencing micro-ops for an instruction, the front end 201 of the machine resumes fetching micro-ops from the trace cache 230.

The out-of-order execution engine 203 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register aliasing logic maps logical registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206 determine when a uop is ready to execute based on the readiness of their dependent input register operand sources and the availability of the execution resources the uops need to complete their operation. The fast scheduler 202 of one embodiment can schedule on each half of the main clock cycle while the other schedulers can schedule once per main processor clock cycle. The schedulers arbitrate for the dispatch ports to schedule uops for execution.

Physical register files 208, 210 sit between the schedulers 202, 204, 206, and the execution units 212, 214, 216, 218, 220, 222, 224 in the execution block 211. There is a separate register file 208, 210 for integer and floating point operations, respectively. Each register file 208, 210, of one embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128 bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of one embodiment is comprised of a number of execution units: address generation unit (AGU) 212, AGU 214, fast ALU 216, fast ALU 218, slow ALU 220, floating point ALU 222, floating point move unit 224. For one embodiment, the floating point execution blocks 222, 224, execute floating point, MMX, SIMD, and SSE, or other operations. The floating point ALU 222 of one embodiment includes a 64 bit by 64 bit floating point divider to execute divide, square root, and remainder micro-ops. For systems and methods described herein, instructions involving a floating point value may be handled with the floating point hardware. In one embodiment, the ALU operations go to the high-speed ALU execution units 216, 218. The fast ALUs 216, 218, of one embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For one embodiment, the integer ALUs 216, 218, 220 are described in the context of performing integer operations on 64 bit data operands. In alternative embodiments, the ALUs 216, 218, 220 can be implemented to support a variety of data bits including 16, 32, 128, 256, etc. Similarly, the floating point units 222, 224 can be implemented to support a range of operands having bits of various widths. For one embodiment, the floating point units 222, 224 can operate on 128 bits wide packed data operands in conjunction with SIMD and multimedia instructions.

In one embodiment, the uops schedulers 202, 204, 206 dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. The dependent operations should be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register aliasing, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX registers (also referred to as 'mm' registers in some instances) in microprocessors enabled with the MMX™ technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

FIGS. 9a-9b schematically illustrate elements of a processor micro-architecture, in accordance with one or more aspects of the present disclosure. In FIG. 9a, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

In FIG. 9b, arrows denote a coupling between two or more units and the direction of the arrow indicates a direction of data flow between those units. FIG. 9b shows processor core 111 including a front end unit 430 coupled to an execution engine unit 450, and both are coupled to a memory unit 470.

The core 111 may be a reduced instruction set computing (RISC) core, a complex instruction set computing (CISC) core, a very long instruction word (VLIW) core, or a hybrid or alternative core type. As yet another option, the core 111 may be a special-purpose core, such as, for example, a network or communication core, compression engine, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to a level 2 (L2) cache unit 476 in the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 454 to illustrate various ways in which register aliasing and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register aliasing, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 162 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The L2 cache unit 476 is coupled to one or more other levels of cache and eventually to a main memory.

By way of example, the exemplary register aliasing, out-of-order issue/execution core architecture may implement the pipeline 400 as follows: the instruction fetch 438 performs the fetch and length decoding stages 402 and 404; the decode unit 440 performs the decode stage 406; the rename/allocator unit 452 performs the allocation stage 408 and renaming stage 410; the scheduler unit(s) 456 performs the schedule stage 412; the physical register file(s) unit(s) 458 and the memory unit 470 perform the register read/memory read stage 414; the execution cluster 460 perform the execute stage 416; the memory unit 470 and the physical register file(s) unit(s) 458 perform the write back/memory write stage 418; various units may be involved in the exception handling stage 422; and the retirement unit 454 and the physical register file(s) unit(s) 458 perform the commit stage 424.

The core 111 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

In certain implementations, the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register aliasing is described in the context of out-of-order execution, it should be understood that register aliasing may be used in an in-order architecture. While the illustrated embodiment of the processor also includes a separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

In certain implementations, processor core 111 may be designed as an out-of-order (OOO) core in order to improve the performance by executing instructions as soon as their operands become available, rather than in the program order. However, the performance benefit may be offset by a considerable increase in the power consumption. When multiple execution threads are available for the operating system to schedule, employing multiple in-order cores rather than large OOO cores may improve the energy consumption profile of the processor without compromising the overall performance. Thus, to improve the performance and energy consumption scalability of a processor, the latter may be designed to support a variable number of cores depending on the performance needs and the number of threads available to the operating system for scheduling.

Figure 10:
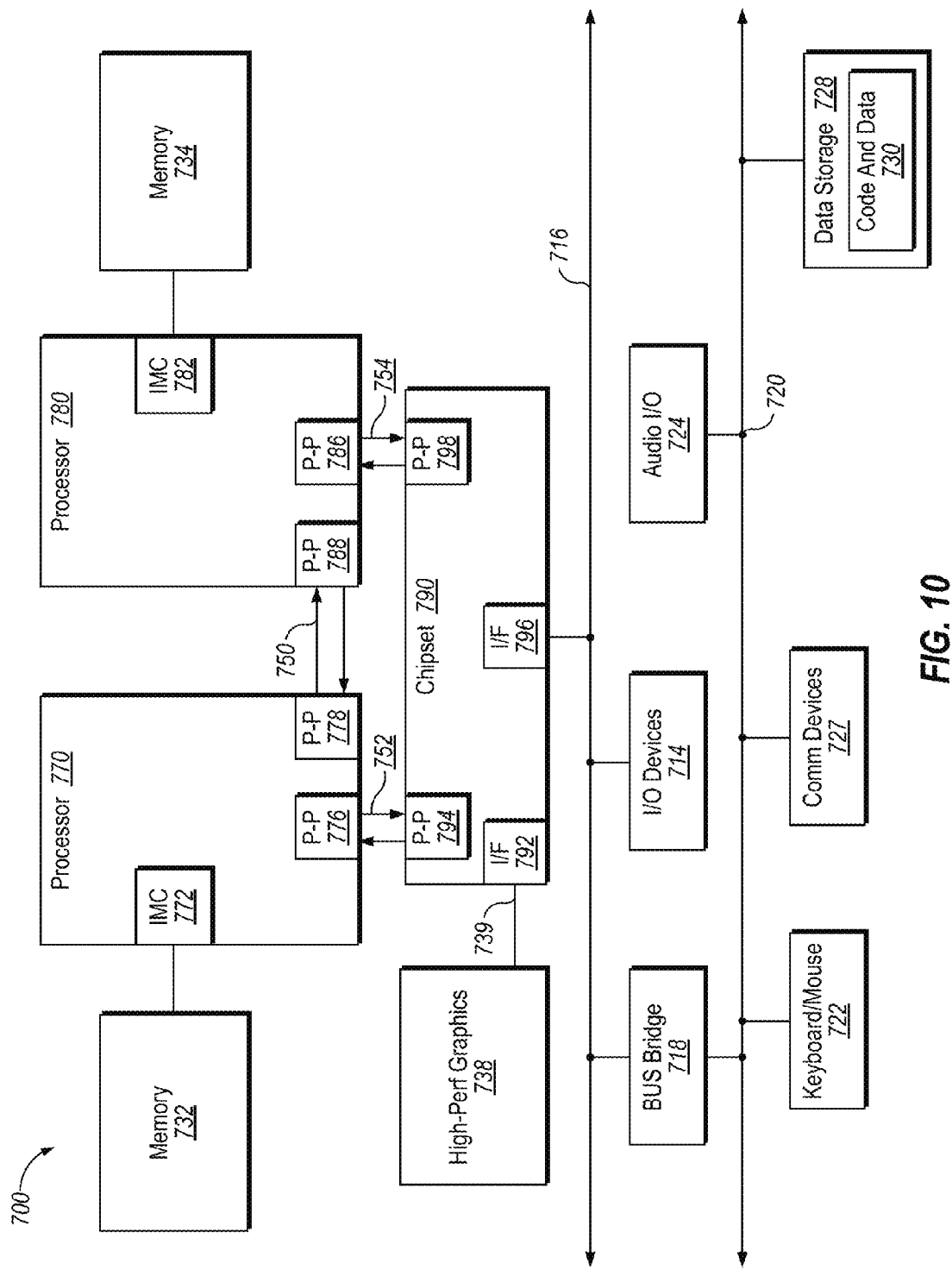
FIG. 10 depicts a block diagram of an example computer system, in accordance with one or more aspects of the present disclosure.

FIG. 10 depicts a block diagram of an example computer system 700, in accordance with one or more aspects of the present disclosure. As shown in FIG. 10, multiprocessor system 700 is a point-to-point interconnect system, and includes a first processor 770 and a second processor 780 coupled via a point-to-point interconnect 750. Each of processors 770 and 780 may be some version of processing system 100 capable of implementing virtual machine-based protected video paths, as described in more details herein above. While shown with only two processors 770, 780, it is to be understood that the scope of the present disclosure is not so limited. In other embodiments, one or more additional processors may be present in the example computer system.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 10, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 10, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720.

Figure 11:
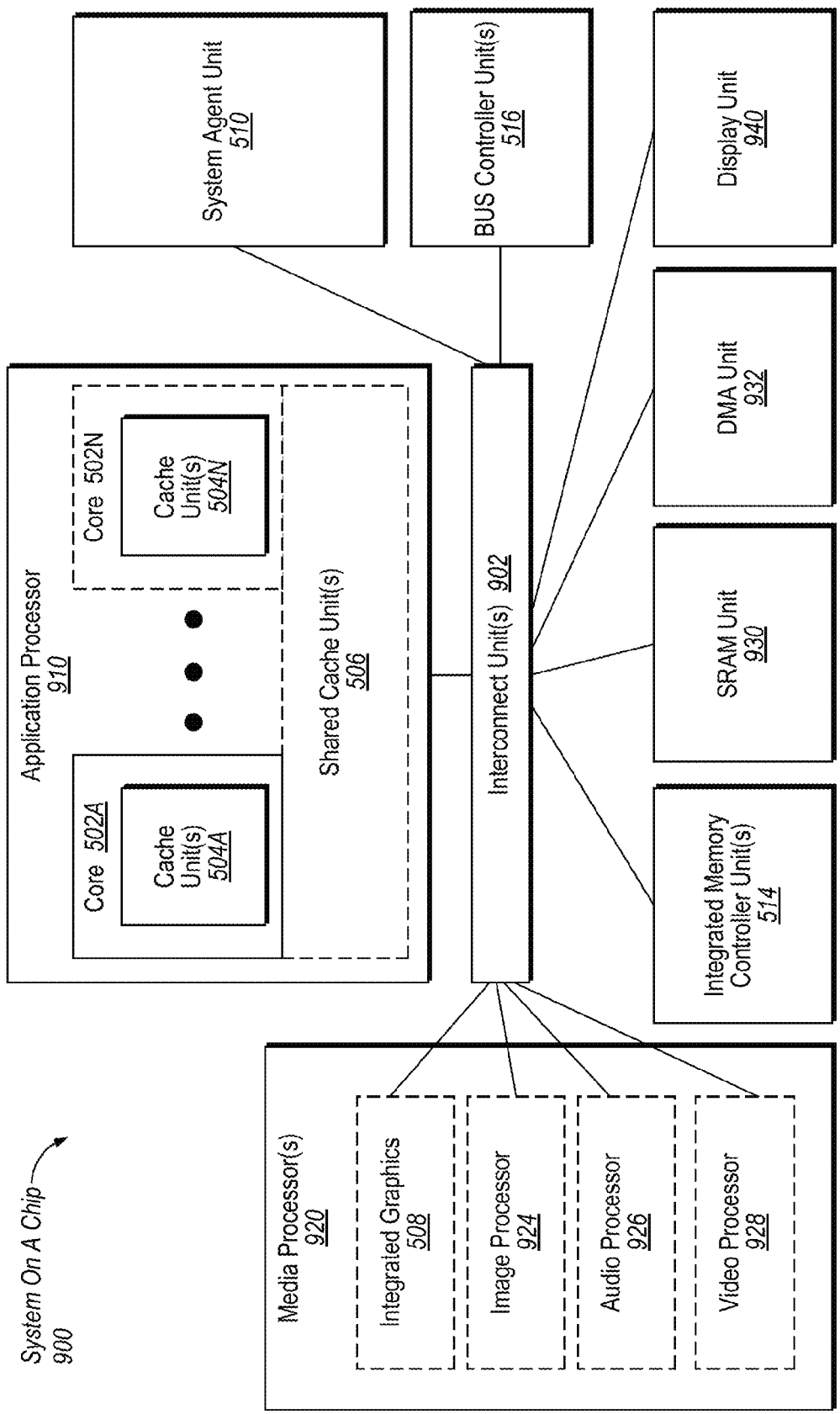
FIG. 11 depicts a block diagram of an example system on a chip (SoC), in accordance with one or more aspects of the present disclosure.

FIG. 11 depicts a block diagram of an example system on a chip (SoC) 900, in accordance with one or more aspects of the present disclosure. The application processor 910 provided by some version of processing system 100 capable of implementing virtual machine-based protected video paths, as described in more details herein above. As schematically illustrated by FIG. 11, interconnect unit(s) 902 may be coupled to: an application processor 910 which includes a set of one or more cores 902A-N and shared cache unit(s) 906; a system agent unit 910; a bus controller unit(s) 916; an integrated memory controller unit(s) 914; a set or one or more media processors 920 which may include integrated graphics logic 908, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays.

Figure 12:
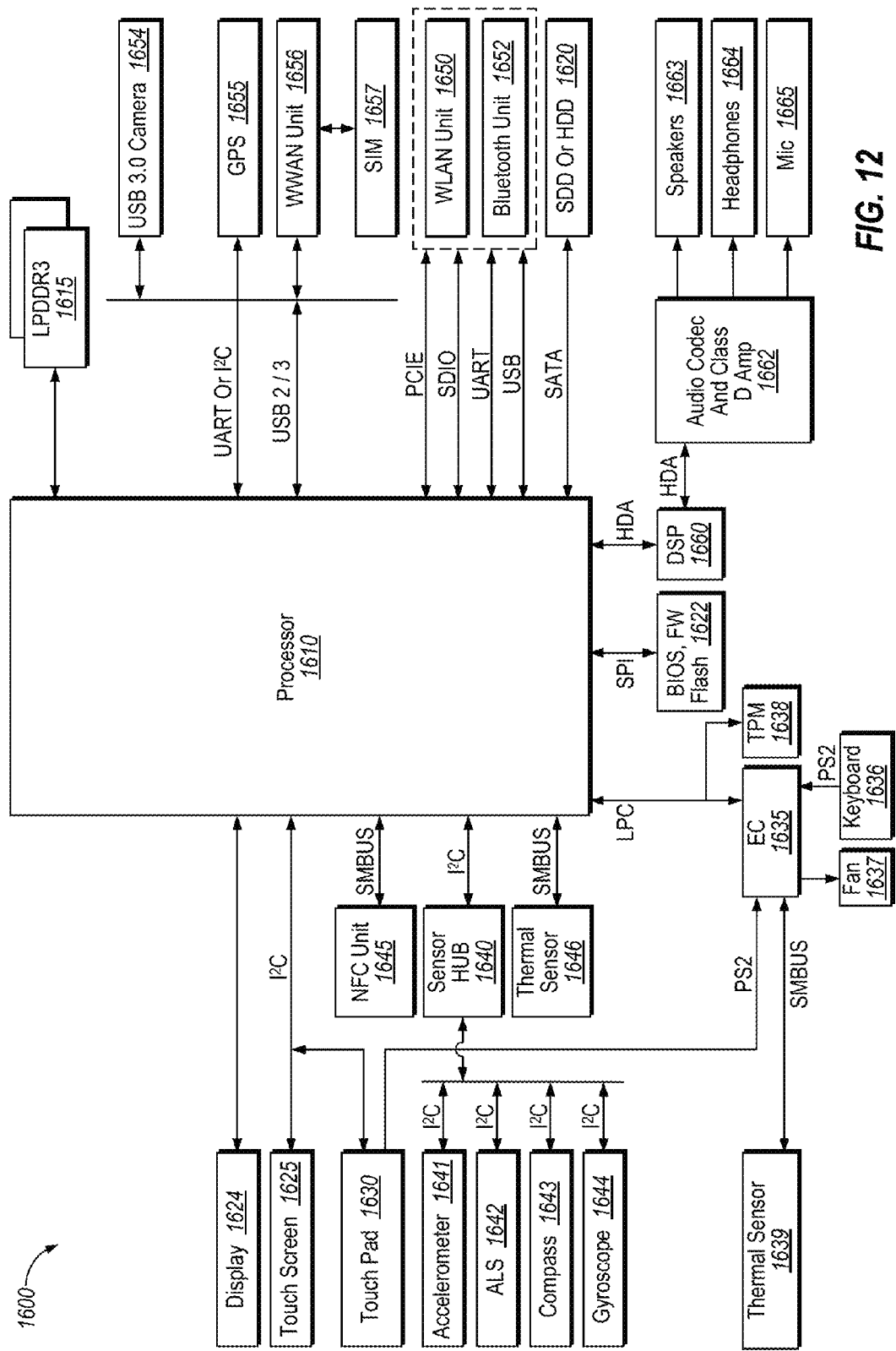
FIG. 12 depicts a block diagram of an example computer system, in accordance with one or more aspects of the present disclosure.

FIG. 12 depicts a block diagram of an example computer system, in accordance with one or more aspects of the present disclosure. Processor 1610 may be provided by some version of processing system 100 capable of implementing virtual machine-based protected video paths, as described in more details herein above.

The system 1600 schematically illustrated by FIG. 12 may include any combination of components implemented as ICs, portions thereof, discrete electronic devices, or other modules, logic, hardware, software, firmware, or a combination thereof adapted in a computer system, or as components otherwise incorporated within a chassis of the computer system. The block diagram of FIG. 12 is intended to show a high level view of many components of the computer system. However, it is to be understood that some of the components shown may be omitted, additional components may be present, and different arrangement of the components shown may occur in other implementations.

Processor 1610 may be provided by a microprocessor, multi-core processor, multithreaded processor, an ultra low voltage processor, an embedded processor, or other known processing element. In the illustrated implementation, processor 1610 acts as a main processing unit and central hub for communication with many of the various components of the system 1600. As one example, processor 1600 may be implemented as a system on a chip (SoC). As a specific illustrative example, processor 1610 includes an Intel® Architecture Core™-based processor such as an i3, i5, i7 or another such processor available from Intel Corporation, Santa Clara, Calif.

Processor 1610 may communicate with a system memory 1615. In various implementations the individual memory devices may be of different package types such as single die package (SDP), dual die package (DDP) or quad die package (1P). These devices, in some implementations, may be directly soldered onto a motherboard to provide a lower profile solution, while in other implementations the devices may be configured as one or more memory modules that in turn couple to the motherboard by a given connector. Other memory implementations are possible, such as other types of memory modules, e.g., dual inline memory modules (DIMMs) of different varieties including but not limited to microDIMMs, MiniDIMMs. In one illustrative example, the memory may be sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 1620 may be also coupled to processor 1610. In certain implementations, to enable a thinner and lighter system design as well as to improve system responsiveness, the mass storage 1620 may be implemented via a SSD. In other implementations, the mass storage may primarily be provided by a hard disk drive (HDD) with a smaller amount of SSD storage to act as a SSD cache to enable non-volatile storage of context state and other such information during power down events so that a fast power up can occur on re-initiation of system activities.

Also shown in FIG. 12, a flash device 1622 may be coupled to processor 1610, e.g., via a serial peripheral interface (SPI). The flash device 1622 may provide for non-volatile storage of system software, including a basic input/output software (BIOS) as well as other firmware of the system.

In various implementations, the mass storage of the system may be provided by a SSD alone or as a disk, optical or other drive with an SSD cache. In some implementations, the mass storage may be provided by an SSD or as a HDD along with a restore (RST) cache module. The SSD cache may be configured as a single level cache (SLC) or multi-level cache (MLC) option to provide an appropriate level of responsiveness.

Various input/output (TO) devices may be present within system 1600, including, e.g., a display 1624 which may be provided by a high definition LCD or LED panel configured within a lid portion of the chassis. This display panel may also provide for a touch screen 1625 adapted externally over the display panel such that via a user's interaction with this touch screen, user inputs can be provided to the system to enable desired operations, e.g., with regard to the display of information, accessing of information and so forth. In certain implementations, display 1624 may be coupled to processor 1610 via a display interconnect that can be implemented as a high performance graphics interconnect. Touch screen 1625 may be coupled to processor 1610 via another interconnect, which in an embodiment can be an I2C interconnect. In addition to touch screen 1625, user input by way of touch can also occur via a touch pad 1630 which may be configured within the chassis and may also be coupled to the same I2C interconnect as touch screen 1625.

Various sensors may be present within the system and may be coupled to processor 1610 in different manners. Certain inertial and environmental sensors may couple to processor 1610 through a sensor hub 1640, e.g., via an I2C interconnect. These sensors may include an accelerometer 1641, an ambient light sensor (ALS) 1642, a compass 1643 and a gyroscope 1644. Other environmental sensors may include one or more thermal sensors 1646 which in some embodiments couple to processor 1610 via a system management bus (SMBus) bus. In certain implementations, one or more infrared or other heat sensing elements, or any other element for sensing the presence or movement of a user may be present.

Various peripheral devices may couple to processor 1610 via a low pin count (LPC) interconnect. In certain implementations, various components can be coupled through an embedded controller 1635. Such components can include a keyboard 1636 (e.g., coupled via a PS2 interface), a fan 1637, and a thermal sensor 1639. In some embodiments, touch pad 1630 may also couple to EC 1635 via a PS2 interface. In addition, a security processor such as a trusted platform module (TPM) 1638 in accordance with the Trusted Computing Group (TCG) TPM Specification Version 1.2, dated Oct. 2, 2003, may also couple to processor 1610 via this LPC interconnect.

In certain implementations, peripheral ports may include a high definition media interface (HDMI) connector (which can be of different form factors such as full size, mini or micro); one or more USB ports, such as full-size external ports in accordance with the Universal Serial Bus Revision 3.0 Specification (November 2008), with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 1600 can communicate with external devices in a variety of manners, including wirelessly. In the embodiment shown in FIG. 16, various wireless modules, each of which can correspond to a radio configured for a particular wireless communication protocol, are present. One manner for wireless communication in a short range such as a near field may be via a near field communication (NFC) unit 1645 which may communicate, in one embodiment with processor 1610 via an SMBus.

Additional wireless units can include other short range wireless engines including a WLAN unit 1650 and a Bluetooth unit 1652. Using WLAN unit 1650, Wi-Fi™ communications in accordance with a given Institute of Electrical and Electronics Engineers (IEEE) 802.11 standard can be realized, while via Bluetooth unit 1652, short range communications via a Bluetooth protocol can occur. These units may communicate with processor 1610 via, e.g., a USB link or a universal asynchronous receiver transmitter (UART) link. Or these units may couple to processor 1610 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 1656 which in turn may couple to a subscriber identity module (SIM) 1657. In addition, to enable receipt and use of location information, a GPS module 1655 may also be present.

To provide for audio inputs and outputs, an audio processor can be implemented via a digital signal processor (DSP) 1660, which may couple to processor 1610 via a high definition audio (HDA) link. Similarly, DSP 1660 may communicate with an integrated coder/decoder (CODEC) and amplifier 1662 that in turn may couple to output speakers 1663 which may be implemented within the chassis. Similarly, amplifier and CODEC 1662 can be coupled to receive audio inputs from a microphone 1665.

Figure 13:
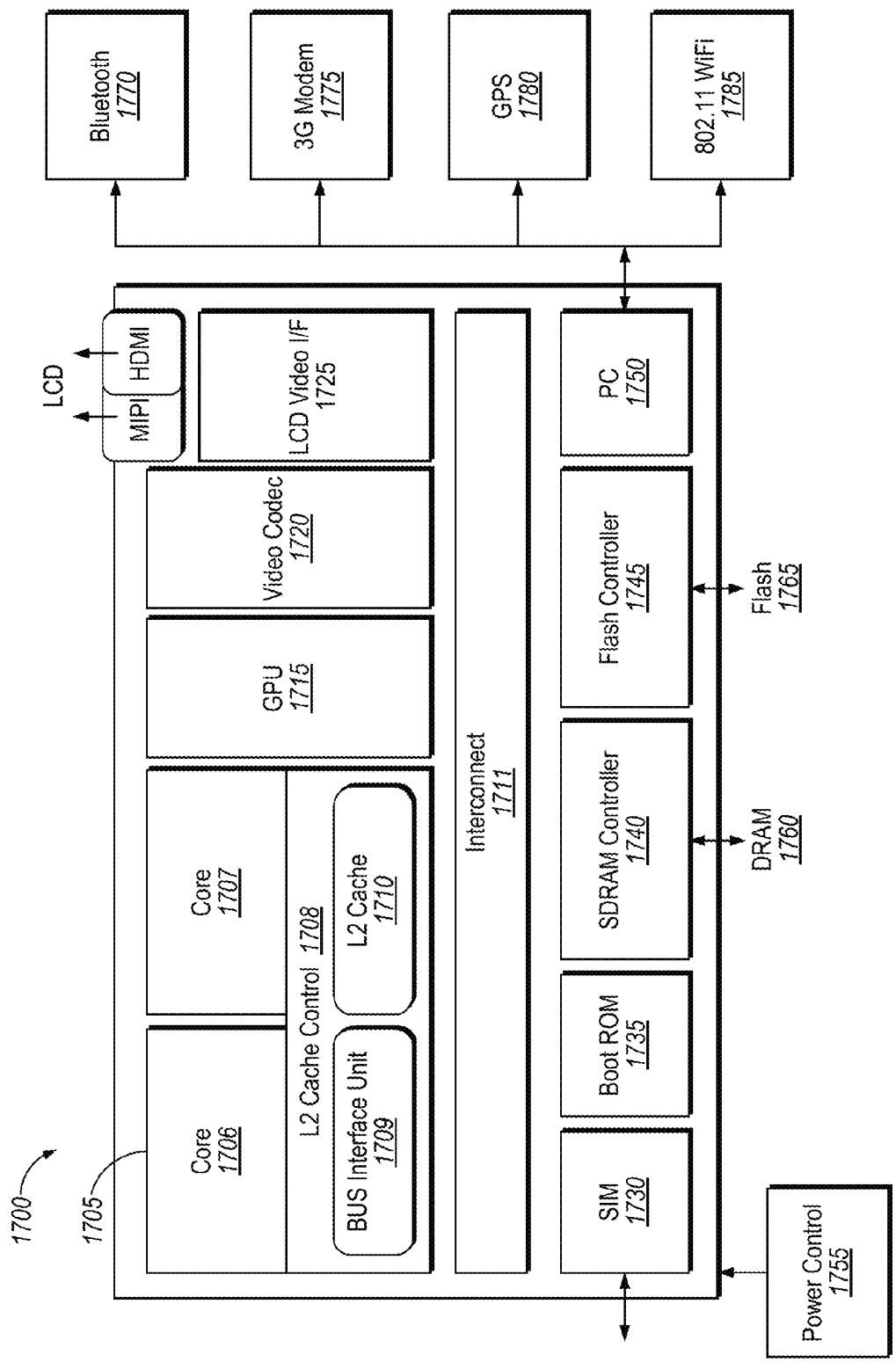
FIG. 13 depicts a block diagram of an example system on a chip (SoC), in accordance with one or more aspects of the present disclosure.

FIG. 13 depicts a block diagram of an example system on a chip (SoC), in accordance with one or more aspects of the present disclosure. As a specific illustrative example, SOC 1700 may be included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

As schematically illustrated by FIG. 13, SOC 1700 may include two cores. Cores 1706 and 1707 may be coupled to cache control 1708 that is associated with bus interface unit 1709 and L2 cache 1710 to communicate with other parts of system 1700. Interconnect 1710 may include an on-chip interconnect, such as an IOSF, AMBA, or other interconnect.

Interface 1710 may provide communication channels to the other components, such as a Subscriber Identity Module (SIM) 1730 to interface with a SIM card, a boot ROM 1735 to hold boot code for execution by cores 1706 and 1707 to initialize and boot SOC 1700, a SDRAM controller 1740 to interface with external memory (e.g., DRAM 1760), a flash controller 1745 to interface with non-volatile memory (e.g., flash 1765), a peripheral control 1550 (e.g., Serial Peripheral Interface) to interface with peripherals, video codecs 1720 and Video interface 1725 to display and receive input (e.g., touch enabled input), GPU 1715 to perform graphics related computations, etc. In addition, the system may comprise peripherals for communication, such as a Bluetooth module 1770, 3G modem 1775, GPS 1785, and WiFi 1785.

Other computer system designs and configurations may also be suitable to implement the systems and methods described herein. The following examples illustrate various implementations in accordance with one or more aspects of the present disclosure.

Example 1 is a processing system, comprising: a first processing device communicatively coupled to a real-time clock, the first processing device to modify an epoch value associated with the real-time clock responsive to detecting a reset of the real-time clock; and a second processing device to execute, in a first trusted execution environment, a first application to receive, from the first processing device, a first time value outputted by the real-time clock and a first epoch value associated with the real-time clock.

Example 2 is the processing system of Example 1, wherein the first trusted execution environment is implemented by a secure enclave.

Example 3 is the processing system of any of Examples 1-2, wherein the second processing device is further to: securely store the first epoch value in a local memory.

Example 4 is the processing system of any of Examples 1-3, wherein the second processing device is further to: authenticate the first processing device by validating a cryptographically protected identifier of the first processing device.

Example 5 is the processing system of any of Examples 1-4, wherein the second processing device is further to establish a cryptographically protected communication channel between the first processing device and the second processing device.

Example 6 is the processing system of any of Examples 1-5, wherein the second processing device is further to: receive, over the secure communication channel, a second time value outputted by the real-time clock and a second epoch value associated with the real-time clock; and detect an error state responsive to determining that the second epoch value is different from the first epoch value.

Example 7 is the processing system of Example 6, wherein the second processing device is further to execute, in a second trusted execution environment, a second application to receive, from the first application, at least one of the first time value or the second time value.

Example 8 is a method, comprising: establishing, by a first application being executed by a first processing device of a processing system in a first trusted execution environment, a cryptographically protected communication channel with a second processing device of the processing system; receiving, over the cryptographically protected communication channel, a first time value outputted by a real-time clock and a first epoch value associated with the real-time clock; storing, in a memory, the first epoch value associated with the real-time clock; and transmitting the first time value to a second application.

Example 9 is the method of Example 8, wherein the first trusted execution environment is provided by a first secure enclave.

Example 10 is the method of any of Examples 8-9, wherein the second application is executed by the first processing device in a second trusted execution environment.

Example 11 is the method of Example 10, wherein the second trusted execution environment is provided by a second secure enclave.

Example 12 is the method of any of Examples 8-11, further comprising: validating, by the first processing device, a cryptographically protected identifier of the second processing device.

Example 13 is the method of any of Examples 8-12, further comprising: receiving, over the cryptographically protected communication channel, a second time outputted by the real-time clock and a second epoch value associated with the real-time clock; and detecting an error state responsive to determining that that the second epoch value is different from the first epoch value.

Example 14 is the method of Example 13, further comprising: responsive to detecting that the second epoch value matches the first epoch value, transmitting the second time value to the second application.

Example 15 is an apparatus comprising: a memory; and a processing system coupled to the memory, the processing system to perform the method of any of the Examples 8-14.

Example 16 is a computer-readable non-transitory storage medium comprising executable instructions that, when executed by a processing system, cause the processing system to perform operations, comprising: establishing, by a first application being executed by the processing system in a first trusted execution environment, a secure communication channel with a second application executed by the processing system in a second trusted execution environment; receiving a digital content item from a digital content server; determining, in view of a lease policy associated with the digital content item, a lease expiration time; responsive to receiving a request to access the digital content item, receiving a current time value over the secure communication channel; and comparing the current time with the lease expiration time.

Example 17 is the computer-readable non-transitory storage medium of Example 16, wherein the first trusted execution environment is provided by a first secure enclave.

Example 18 is the computer-readable non-transitory storage medium of any of Examples 16-17, wherein the first trusted execution environment is provided by a first secure enclave.

Example 19 is the computer-readable non-transitory storage medium of any of Examples 16-18, further comprising executable instructions causing the processing system to perform operations, comprising: responsive to determining that the current time does not exceed the lease expiration time, satisfying the request to access the digital content item.

Example 20 is the computer-readable non-transitory storage medium of any of Examples 16-19, further comprising executable instructions causing the processing system to perform operations, comprising: responsive to determining that the current time does not exceed the lease expiration time, disallowing the request to access the digital content item.

Example 21 is the computer-readable non-transitory storage medium of any of Examples 16-10, further comprising executable instructions causing the processing system to perform operations, comprising: responsive to receiving the digital content item from the digital content server, requesting a real world current time value from an online time source.

Example 22 is a system on a chip (SoC), comprising: a first processing device communicatively coupled to a real-time clock, the first processing device to modify an epoch value associated with the real-time clock responsive to detecting a reset of the real-time clock; and a second processing device to execute, in a first trusted execution environment, a first application to receive, from the first processing device, a first time value outputted by the real-time clock and a first epoch value associated with the real-time clock.

Example 23 is the SoC of Example 22, wherein the first trusted execution environment is implemented by a secure enclave.

Example 24 is the SoC of any of Examples 22-23, wherein the second processing device is further to: securely store the first epoch value in a local memory.

Example 25 is the SoC of any of Examples 22-24, wherein the second processing device is further to: authenticate the first processing device by validating a cryptographically protected identifier of the first processing device.

Example 26 is the SoC of any of Examples 22-25, wherein the second processing device is further to establish a cryptographically protected communication channel between the first processing device and the second processing device.

Example 27 is the SoC of any of Examples 22-26, wherein the second processing device is further to: receive, over the secure communication channel, a second time value outputted by the real-time clock and a second epoch value associated with the real-time clock; and detect an error state responsive to determining that the second epoch value is different from the first epoch value.

Example 28 is the SoC of Example 27, wherein the second processing device is further to execute, in a second trusted execution environment, a second application to receive, from the first application, at least one of the first time value or the second time value.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

The invention claimed is:

1. A processing system, comprising:
   a first processing device communicatively coupled to a real-time clock, the first processing device to modify an epoch value associated with the real-time clock responsive to detecting a reset of the real-time clock; and
   a second processing device implementing an architecturally-protected memory utilizing an enclave page cache (EPC), wherein the second processing device is to execute, in a first trusted execution environment, a first application to:
   authenticate the first processing device by validating a cryptographically protected identifier of the first processing device;
   transmit, to the first processing device, a request to create a virtual clock, the request comprising a base time value for initializing the virtual clock;
   receive, from the first processing device, a first time value of the virtual clock and a first epoch value associated with the real-time clock; and store the first epoch value in the architecturally-protected memory.

2. The processing system of claim 1, wherein the first trusted execution environment is implemented by a secure enclave.

3. The processing system of claim 1, wherein the second processing device is further to establish a cryptographically protected communication channel between the first processing device and the second processing device.

4. The processing system of claim 1, wherein the second processing device is further to:
receive, over the secure communication channel, a second time value of the virtual clock and a second epoch value associated with the real-time clock; and
detect an error state responsive to determining that the second epoch value is different from the first epoch value.

5. The processing system of claim 4, wherein the second processing device is further to execute, in a second trusted execution environment, a second application to receive, from the first application, at least one of the first time value or the second time value.

6. A method, comprising:
authenticating, by a first processing device of a processing system, a second processing device of the processing system by validating a cryptographically protected identifier of the first processing device;
establishing, by a first application being executed by the first processing device in a first trusted execution environment, a cryptographically protected communication channel with the second processing device;
transmitting, over the cryptographically protected communication channel, a request to create a virtual clock, the request comprising a base time value for initializing the virtual clock;
receiving, over the cryptographically protected communication channel, a first time value of the virtual clock and a first epoch value associated with the virtual clock;
storing, in an architecturally-protected memory utilizing an enclave page cache (EPC), the first epoch value; and
transmitting the first time value to a second application.

7. The method of claim 6, wherein the first trusted execution environment is provided by a first secure enclave.

8. The method of claim 6, wherein the second application is executed by the first processing device in a second trusted execution environment.

9. The method of claim 8, wherein the second trusted execution environment is provided by a second secure enclave.

10. The method of claim 6, further comprising:
receiving, over the cryptographically protected communication channel, a second time of the virtual clock and a second epoch value associated with the real-time clock; and
detecting an error state responsive to determining that that the second epoch value is different from the first epoch value.

11. The method of claim 10, further comprising:
responsive to detecting that the second epoch value matches the first epoch value, transmitting the second time value to the second application.

12. A computer-readable non-transitory storage medium comprising executable instructions that, when executed by a processing system, cause the processing system to perform operations, comprising:
establishing, by a first application being executed by the processing system in a first trusted execution environment, a secure communication channel with a second application executed by the processing system in a second trusted execution environment;
transmitting, over the secure communication channel, a request to create a virtual clock, the request comprising a base time value for initializing the virtual clock;
receiving a digital content item from a digital content server;
determining, in view of a lease policy associated with the digital content item, a lease expiration time;
responsive to receiving a request to access the digital content item, receiving, over the secure communication channel, a virtual clock value and an epoch value associated with the virtual clock value;
storing, in an architecturally-protected memory utilizing an enclave page cache (EPC), the epoch value associated with the virtual clock; and
comparing the virtual clock value with the lease expiration time.

13. The computer-readable non-transitory storage medium of claim 12, wherein the first trusted execution environment is provided by a first secure enclave.

14. The computer-readable non-transitory storage medium of claim 12, wherein the first trusted execution environment is provided by a first secure enclave.

15. The computer-readable non-transitory storage medium of claim 12, further comprising executable instructions causing the processing system to perform operations, comprising:
responsive to determining that the virtual clock value does not exceed the lease expiration time, satisfying the request to access the digital content item.

16. The computer-readable non-transitory storage medium of claim 12, further comprising executable instructions causing the processing system to perform operations, comprising:
responsive to determining that the virtual clock value does not exceed the lease expiration time, disallowing the request to access the digital content item.

17. The computer-readable non-transitory storage medium of claim 12, further comprising executable instructions causing the processing system to perform operations, comprising:
responsive to receiving the digital content item from the digital content server, requesting a current time value from an online time source.

* * * * *